US012618422B2

(12) United States Patent
Talami et al.

(10) Patent No.: US 12,618,422 B2
(45) Date of Patent: May 5, 2026

(54) HYDRAULIC DISTRIBUTOR WITH COMPENSATION DEVICE FOR DIRECTIONAL VALVES

(71) Applicant: WALVOIL S.P.A., Reggio Emilia (IT)

(72) Inventors: Matteo Talami, Reggio Emilia (IT); Guido Denti, Reggio Emilia (IT); Mattia Scolari, Reggio Emilia (IT)

(73) Assignee: WALVOIL S.P.A., Reggio Emilia (IT)

(*) Notice: Subject to any disclaimer, the term of this patent is extended or adjusted under 35 U.S.C. 154(b) by 0 days.

(21) Appl. No.: 18/911,406

(22) Filed: Oct. 10, 2024

(65) Prior Publication Data

US 2025/0116282 A1 Apr. 10, 2025

(51) Int. Cl.
*F15B 11/16* (2006.01)
*F15B 13/04* (2006.01)

(52) U.S. Cl.
CPC .......... *F15B 11/16* (2013.01); *F15B 13/0418* (2013.01); *F15B 2211/30505* (2013.01); *F15B 2211/3059* (2013.01); *F15B 2211/3116* (2013.01); *F15B 2211/3122* (2013.01); *F15B 2211/3133* (2013.01); *F15B 2211/45* (2013.01); *F15B 2211/50518* (2013.01); *F15B 2211/78* (2013.01)

(58) Field of Classification Search
CPC .. F15B 11/16; F15B 13/0402; F15B 13/0403; F15B 13/0417; F15B 13/0418; F15B 2211/30545; F15B 2211/3116
See application file for complete search history.

(56) References Cited

U.S. PATENT DOCUMENTS

| | | | | |
|---|---|---|---|---|
| 6,192,929 | B1 * | 2/2001 | Matsumoto | F15B 11/163 137/596.1 |
| 10,968,923 | B2 | 4/2021 | Fukuda et al. | |
| 10,975,893 | B2 * | 4/2021 | Fukuda | F15B 11/16 |
| 11,255,353 | B2 | 2/2022 | Fukuda et al. | |

OTHER PUBLICATIONS

Search report from Priority Italian Application No. 102023000002109, dated Apr. 15, 2024.

* cited by examiner

*Primary Examiner* — Michael Leslie
(74) *Attorney, Agent, or Firm* — Carmel Patent Agency; Robert Ballarini

(57) ABSTRACT

An open-center valve device for operating machines includes: a first section and a second section, a high-pressure line configured in such a way as to be connected to a pump to supply an operating fluid flow rate to the sections, and a discharge line configured to be connected to an outlet of the operating fluid. Each of the sections includes a spool control element, configured in such a way as to send the fluid flow rate to the respective work ports. The valve device further includes one or more free flow segments, a series duct configured in such a way that, upon a movement from the neutral position of one of the control elements for operating one of the actuators, a return flow rate from a respective work port is supplied to a subsequent control element, progressively closing the respective free flow passage.

9 Claims, 4 Drawing Sheets

HYDRAULIC DISTRIBUTOR WITH COMPENSATION DEVICE FOR DIRECTIONAL VALVES

CROSS-REFERENCE TO RELATED APPLICATIONS

This application claims benefit of Italian Patent Application No. 102023000021090, filed Oct. 10, 2023, the entire contents of which are incorporated herein as if fully set forth.

FIELD OF APPLICATION

The present invention relates to a valve device for an operating machine and a hydraulic system comprising the same.

TECHNOLOGICAL BACKGROUND

A typical example of an operating machine comprises a boom crane, a bucket, a hydraulic cylinder of the boom crane configured to operate the boom crane, a hydraulic cylinder of the bucket configured to operate the bucket, and one or more auxiliary actuators configured to operate auxiliary attachments.

The respective hydraulic cylinders are operated by respective sections of a control valve present in the hydraulic circuit of the operating machine.

For example, a first section can be configured to control the lengthening and shortening of the boom crane cylinder, a second section of the control valve configured to control the lengthening and shortening of the bucket cylinder, and a third section of the control valve configured to operate the auxiliary actuator.

Typically, such sections are provided with relative spools and when the spool of the first valve section is not operated, the hydraulic oil sent from the pump passes through the inside of the spool itself and is supplied to the second section of the valve and, through the spool of the latter, to the subsequent sections.

This constructive solution of the valve is referred to in the jargon as ‘free circulation LC’ passage.

When the spool of the first control section is operated, the hydraulic oil returns from the cylinder boom crane of the first control device passing back from the first control section and is used to feed the second control section and the subsequent sections.

This type of hydraulic circuit is referred to as a ‘series circuit’.

One of the known problems of the series circuit occurs in the case of simultaneous operation of several hydraulic cylinders.

For example, when the first section of the control valve (e.g., boom crane cylinder) and the second section of the control valve (e.g., bucket cylinder) are operated at the same time, the operations could deteriorate. In particular, if the cylinder controlled by the second control section reaches its limit switch, two undesirable functional faults can occur. The first is the pressurization of the series channel and thus of the cylinder chamber opposite the connection to the feed line, which leads to unintended movement of the cylinder itself in the opposite direction.

Said problem is solved by the use of non-return valves along the series duct of the first control section to prevent back flow along the series channel itself with respect to the user-controlled direction. With the introduction of the non-return valve, once the limit switch of a work port controlled by a control section has been reached, there is a latching of the work ports operated by sections preceding the same one which has reached the limit switch, until the spool of the latter section is at least returned to the neutral position, reopening the previously mentioned free circulation LC channel. This can result in some difficulty for the operator and, in general, a feeling of poor maneuverability during the use of the operating machine.

U.S. Pat. No. 11,255,353B2 describes a solution for overcoming the above-mentioned problems.

In such document it is provided a bypass towards the outlet along the series line in such a way that if, during a simultaneous movement, the non-return valve of a cylinder reaching the limit switch closes the passage along the series line itself and effectively blocks the emptying of one of the cylinders upstream of the latter, the bypass allows the opening of said series channel towards the outlet and consequently the disposal of a flow rate.

By disposing the flow rate, the movement of the cylinder upstream of the series duct itself is effectively enabled. The non-return valve seats are moved inside the control valve outside the spools, while on the spool a throttled connection is made between the channel of the series before the non-return valve towards the outlet inside the control spool of the section itself.

However, such a solution requires providing the non-return valve seats on the control valve body at the channels of the series, effectively increasing the size of the control valve itself. Furthermore, the creation of a throttled passage on the spool between the series recess and that of the outlet leads to high-pressure drops and unwanted over-pressurization if the flow rate to be disposed of along the series channel upstream of the non-return valve is high.

The need is therefore felt to improve the known solutions in multi-section hydraulic circuits with a series structure and free circulation.

SUMMARY

The technical problem at the basis of the present invention is to make available a valve device that is structurally and functionally conceived to overcome, at least in part, one or more of the limitations disclosed above with reference to the mentioned prior art.

In the context of such a technical problem, an aim of the present invention is to provide the art with a valve device and a hydraulic system comprising the same capable of improving the operating feel of a hydraulic actuator and maintaining controllability during the execution by the operator of all the movements of the operating machine itself.

A further aim of the invention is to provide a valve device and a hydraulic system which improve the known solutions within the framework of a rational and relatively low-cost solution.

This problem and at least one of these aims are at least partially achieved by the invention, a valve device and by a hydraulic system comprising one or more of the features of the invention disclosed in the independent claims, as well as by the invention as defined by one or more of the following aspects.

According to a first aspect, the present invention relates to an open-center valve device for operating machines comprising a first section and a second section configured to be connected to respective pairs of work ports to operate an actuator of the operating machine.

Preferably, the valve device comprises a high-pressure line configured in such a way as to be connected to a pump to supply an operating fluid flow rate to said sections.

Preferably, the valve device further comprise a discharge line configured to be connected to an outlet of said operating fluid.

Each of said sections preferably comprises a spool control element, configured in such a way as to send the fluid flow rate to the respective work ports.

Preferably, the valve device further comprises one or more free flow segments configured in such a way as to define a free flow line connecting said control elements in successive sequence.

Each of said control elements preferably includes a free-circulation passage configured in such a way that, when all said control elements are in a neutral position, the high-pressure line is connected to said discharge line without sending the flow rate to the work ports.

The valve device further comprises a series duct.

Preferably, the series duct is configured in such a way that, upon a movement from the neutral position of one of said control elements for operating one of said actuators, a return flow rate from a respective work port is supplied to a subsequent control element, progressively closing the respective free flow passage.

At least one of said control elements comprises at least one bypass passage.

When the control device is in the neutral position, the bypass passage is closed and, when the control device is moved from the neutral position to operate the respective actuator, the bypass passage is progressively brought into communication with the outlet.

Advantageously, in the control element of the valve device which is the subject matter of the following invention, an additional passage, substantially in the form of a recess, is made along the cavity of the spool control element, bypassing the series duct, which allows to better manage the flow rate discharge when the non-return valves along the series channel close.

It is thereby possible to make the seat of the same non-return valves inside the spool itself.

The passage area of the discharge can vary depending on the spool stroke of the control element of the section itself.

Based on a second aspect, a maximum pressure valve is inserted along the channel taken from the series bypass before the new passage inserted along the spool cavity, inside the control section.

This maximum pressure valve allows to make the discharge intervene on the series as described in the previous finding, but only upon reaching a certain intervention pressure threshold.

Based on a third aspect of the invention, the valve device comprises a two-way two-position sequence slide valve.

Based on such an aspect, if the flow rate vale to be discharged along the series of the first section is a higher value with respect to the two previous cases, said flow rate is discharged by means of a suitably sized two-way two-position sequence slide valve which is advantageously not directly obtained on the control spool. The additional passage, previously used for managing the flow rate discharge, is preferably only used for managing the switching signal of said discharge slide valve.

In preferred embodiments, the slide valve is normally closed. At one end of the slide valve, on a first end there is the pressure signal of the reduced pressure line V (which can also be used to drive the spools), on the opposite end there is a spring and a reduced pressure V1 decoupled by a throttle with respect to the pressure on the first end of said slide valve. This last end is connected to the previously made recess: through the spool of the distributor section, said end can be put in communication with the outlet line T or with a low-pressure line.

It will be understood that in the context of the present invention a high-pressure line is a line capable of supplying operating fluid to a circuit at a pressure sufficient to operate actuators or other consumers to which the circuit is connected.

In the low-pressure line, the operating fluid therefore has a low-pressure relative to the high-pressure line. Such a low-pressure line can therefore receive the return fluid from the consumers as an alternative to a discharge.

When the spool is not operated, the connection with the outlet is closed. Consequently, the pressure at the ends of the slide valve is the same, V1 is equal to V, and the spring holds the sequence slide valve in the closed condition. By operating the spool, the pressure on the spring side is progressively discharged, the pressure drop generated by the throttle progressively decouples the pressures V1 and V. As soon as the pressure V exceeds the pressure V1 plus the spring force, which acts on the same side as V1, the spool moves from the normally closed position to an open position and allows the first control section to be discharged as in the previous solutions.

Based on a fourth aspect of the invention, a slide valve similar to the one illustrated in the previous aspect is used. In this case, driving pressure V does not act at the ends of the slide valve, but the pressure itself present in the channel of the series psr.

The operating principle is the same as in the previous case: at the ends of the slide valve, on one side there is the pressure present in the channel of the series before the non-return valve psr, on the opposite side a spring and the pressure psr1 decoupled by a throttle with respect to the pressure present on the first end of said slide valve. This last end is connected to the previously made recess: through the spool of the distributor section, said end can be put in communication with the discharge line T or a low-pressure line. When the spool is not operated, the connection with the outlet is closed, so the pressure at the ends of the slide valve is the same, psr is equal to that of psr1 and the spring holds the sequence slide valve in the closed condition. By operating the spool, the pressure on the spring side is progressively discharged, the pressure drop generated by the throttle progressively decouples the pressures psr1 and psr. As soon as psr>psr1+spring force is applied, the slide valve moves from the normally closed position towards an open position and allows the series channel of the first control section to be discharged as in the previous solutions.

Further preferred aspects are also defined in the appended claims as well as in the following description.

BRIEF DESCRIPTION OF THE DRAWINGS

This and other features will be more apparent from the following description of some embodiments illustrated purely by way of example in the accompanying drawings, in which.

DETAILED DESCRIPTION OF THE PREFERRED EMBODIMENTS

Figure 1:
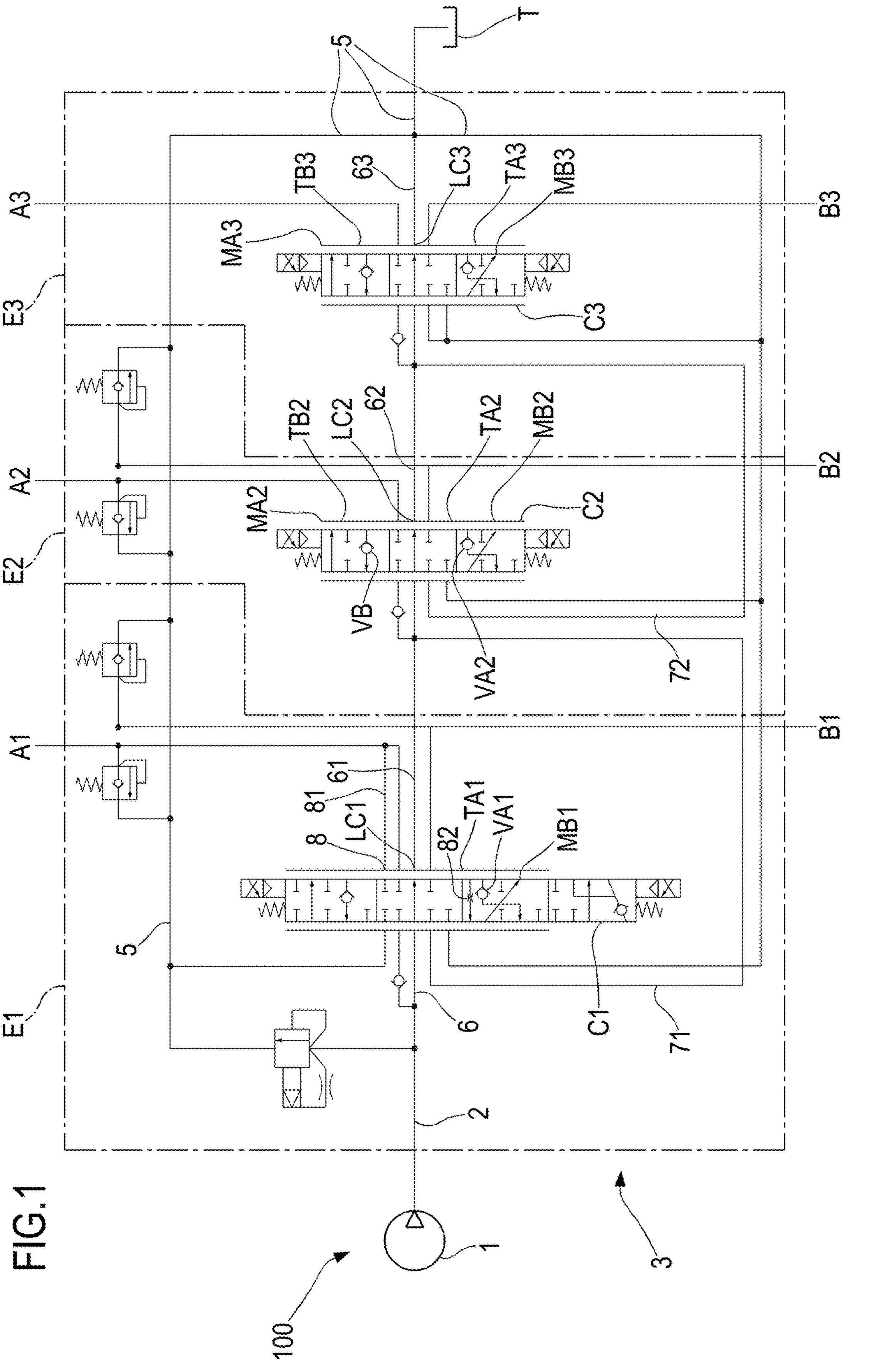
FIG. 1 is a schematic illustration of a valve device and the related hydraulic system made according to the present invention in a first embodiment.

Referring initially to FIG. 1, an open-center valve device in accordance with the invention is illustrated overall with the reference number 3.

The valve device 3 is inserted in the context of a hydraulic system 100 of an operating machine.

The hydraulic system 100 comprises a fixed displacement pump 1, which can be connected to the valve device 3. The connection occurs through a high-pressure line 2.

In the attached figures, the valve device is depicted by way of example with three generic sections E1, E2 and E3, each of which controls a related actuator of the operating machine of the work ports A1, B1, A2, B2, A3 and B3.

Each section E1, E2, E3 comprises at least one spool control element C1, C2, C3 therein.

When the spools are not operated and are in the neutral position, the fluid from the high-pressure line 2 passes through free-circulation passages LC1, LC2 and LC3 along a free flow duct 6 and is sent to the outlet T through the duct 5.

Advantageously, the free flow duct 6 is split into separate segments 61, 62, 63 which connect the control elements of each section.

When a control element C1 or C2 is operated, the high-pressure line 2 is selectively put into communication with the work ports A1, B1, A2, B2, A3 and B3 and actually manages the actuators of the operating machine in which the control valve device is inserted.

Such a configuration defines delivery passages MA1, MA2, MA3, MB1, MB2 and MB3 on the respective control element.

The work port B1, A1, B2, A2, B3 and A3 selectively not put in communication with the high-pressure line 2 is connected to the next segment of the free flow duct 61, 62 and 63 through series ducts 71, 72.

Such a connection defines respective return passages TA1, TA2, TA3, TB1, TB2 and TB3 on the control element.

The free-circulation passage LC1, LC2 and LC3 defined on the control element is closed upon the operation of the control element when the relative spool is moved from the neutral position. Thereby, operating several spools simultaneously, only the first one operated directly feeds the work ports by directly putting the high-pressure line in communication with one work port at a time. The one which is not in communication with the high-pressure line 2 in the same section feeds a respective series duct 71, 72, which returns the fluid along the free-flowing segment of the next section.

The next operated control element which intercepts the free circulation line, since if operated it closes the passage LC and selectively puts the work ports connected thereto in communication with the previously mentioned series ducts and free flow segment, and is in fact fed by the non-fed work port of the previous operated section.

Only in the last operated control element is the selectively non-fed work port put in communication with the outlet T.

Inside the control elements C1, C2 and C3 before the intersection with the series ducts 71, 72 downstream of the return passages TA1, TA2, TB1, TB2, non-return valves VA1, VA2 and VB1, VB2 are inserted to prevent back flow to the work ports in the event of overpressure or limit switch of the work ports operated downstream of said series ducts.

In order to optimize the size of said valves, the corresponding cavities are made inside the spools themselves.

When said non-return valves close, they block the movement of the sections operated upstream of said valves.

The present invention advantageously allows a passage to be provided which allows to discharge the channels defined between the return passages TA1, TA2, TB1 and TB2 and the non-return valves themselves.

For this reason, as shown in FIG. 1, one or more additional passages 8 are inserted along the control element, connected in bypass with the duct comprised between the discharges TA1, TA2, TB1 and TB2 and the non-return valves VA1, VB1, VA2 and VB2 themselves. For the sake of simplicity, only one passage 8 is shown in the figure, which is connected in bypass to the discharge TA1 upstream of VA1 through a bypass duct 81.

In the neutral condition of the spool of the control element C1, the passage 8 is not in communication with any other ducts if not with the bypass duct 81. When the spool of the control element C1 is operated, an additional channel 82 opens through the control element which, as the stroke of the spool changes, progressively puts the control element in communication with the outlet T of the system through the duct 5.

Figure 2:
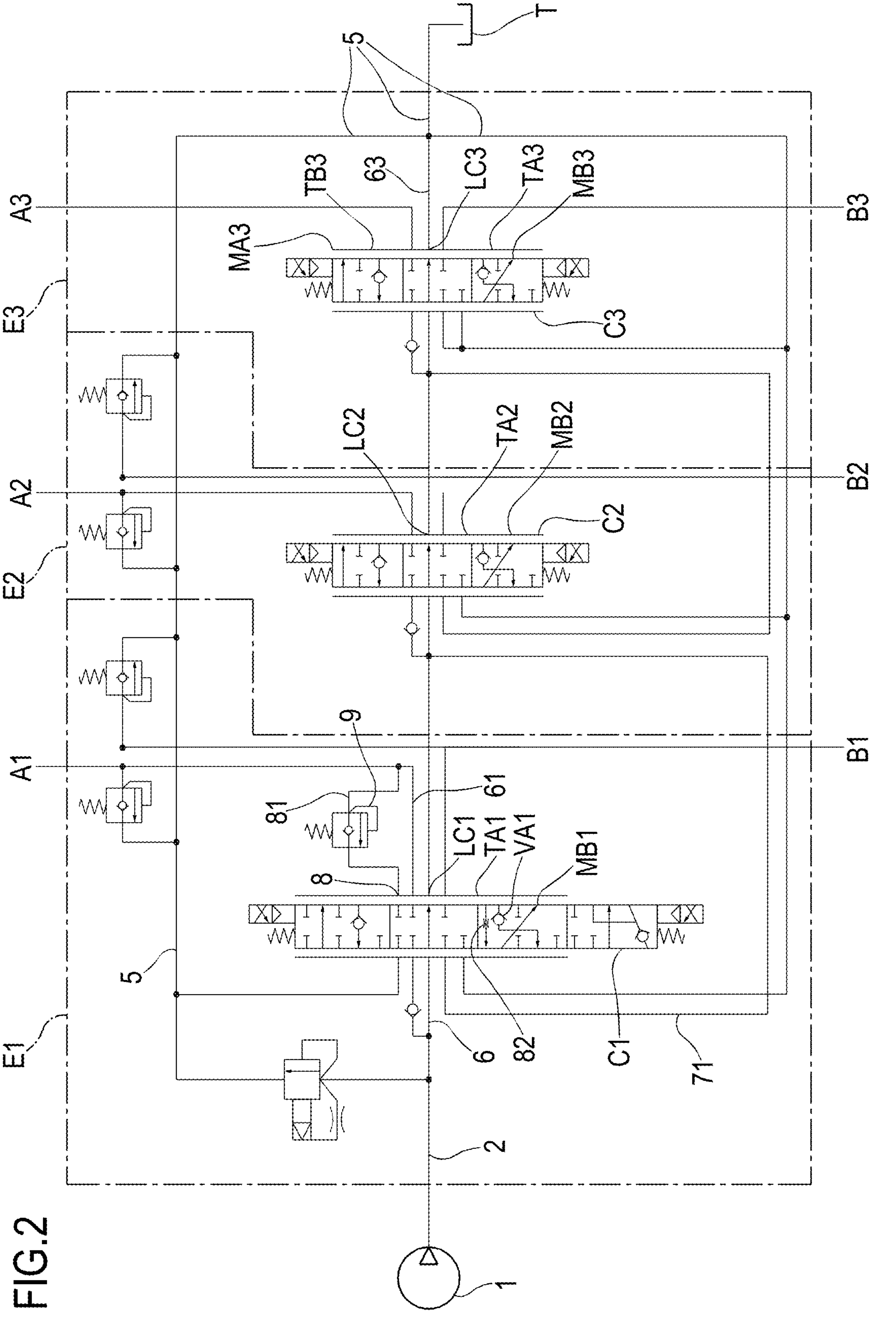
FIG. 2 is a schematic illustration of a valve device and the related hydraulic system made in accordance with a second embodiment of the present invention.

FIG. 2 shows a second embodiment of the invention in which a maximum pressure valve 9 is inserted along the bypass duct 81.

The maximum pressure valve is therefore also in bypass from the passage return line TA1 upstream of the non-return valve VA1 before the bypass passage 8. Said passage is therefore located in the portion 83 of the duct 81 downstream of valve 9. This valve allows the discharge to intervene on the series as described in relation to the previous embodiment, but only upon reaching a certain intervention pressure threshold.

Figure 3:
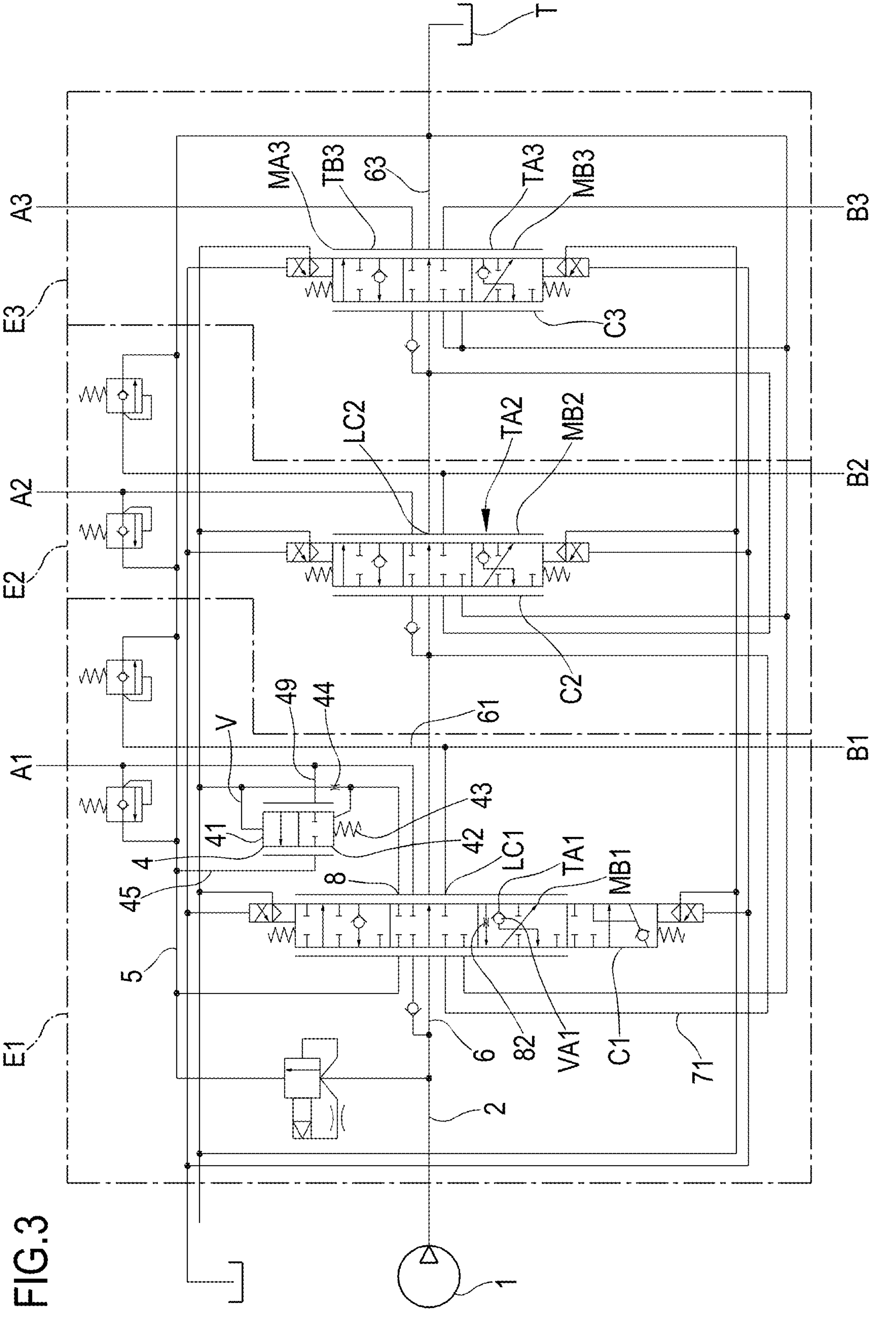
FIG. 3 is a schematic illustration of a valve device and the related hydraulic system made in accordance with a third embodiment of the present invention.

FIG. 3 shows a third embodiment of the invention, if the flow rate value to be discharged along the series of the first section is greater with respect to the two previous cases.

In the present embodiment, the flow rate is discharged by means of a suitably dimensioned two-way two-position sequence slide valve 4, which is not obtained directly along the spool seat of the control element.

The bypass passage 8, which was previously used to manage the flow rate discharge, is now only used to manage the switching signal of said discharge slide valve. Based on the pilot signals received, the slide valve opens a passage along the channel TA1 towards the outlet T The slide valve is normally closed. At the end of the slide valve, on a first end 41 there is the pressure signal of the reduced pressure line V (which can also be used to pilot the spools), a spring 43 and the reduced pressure V1 decoupled by a throttle 44 with respect to the pressure present on the first end of said slide valve acting on the opposite side on the end 42.

Advantageously, this latter end 42 is connected to the previously made passage 8 by means of a control duct 48: through the spool C1 of the distributor section, said end can be put in communication with the discharge line T by means of the passage 82 and the duct 5. When the control element is not operated, the connection 82 with the outlet is closed, and consequently the pressure at the ends of the slide valve is the same, V1 is equal to V, and the spring 43 holds the sequence slide valve 4 in the closed condition.

By operating the control element, the pressure on the spring side 42 is progressively discharged, the pressure drop generated by the throttle 44 progressively decouples the pressures V1 and V. As soon as the pressure V exceeds the sum of the force exerted by the spring 43 and the pressure V1, the slide valve moves from the normally closed position towards an open position and allows to discharge the series channel TA1 of the first control section as in the previous solutions upstream of the non-return valve VA1.

Through the duct 49 taken as a bypass from TA1, a passageway 45 opens towards the discharge line 5 connected to the outlet T.

Figure 4:
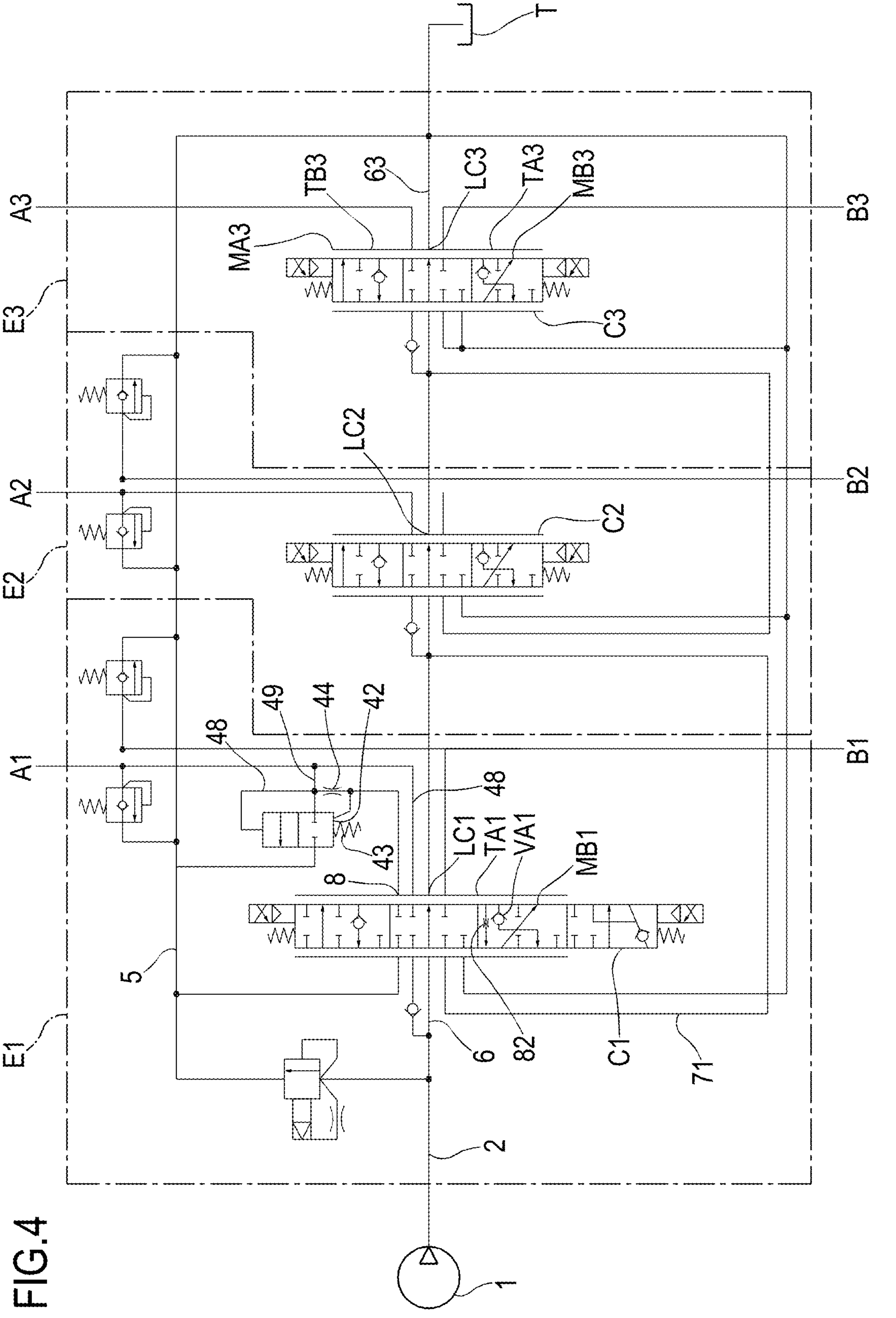
FIG. 4 is a schematic illustration of a valve device and the related hydraulic system made in accordance with a fourth embodiment of the present invention.

FIG. 4 illustrates a fourth embodiment of the invention, in which a slide valve similar to that of the previous invention is used.

In this case, at the ends of the slide valve 4, it is no longer pilot pressure V that acts, but the pressure itself present in the series channel psr.

The operating principle is the same as in the previous case: at the ends of the slide valve 4, there is the pressure psr present in the duct 49 taken in bypass from the passage TA1 before the non-return valve VA1 acting on a first end 41, a spring 43 and the pressure psr1 decoupled by a throttle 44 with respect to the pressure present on the first end of said slide valve acting on the opposite end 42.

This last end 42 is connected with the previously made recess 8 by means of the duct 48: through the control element C1 of the distributor section, said end can be put in communication with the discharge line T by means of the passage 82 and the duct 5. When the control element is not operated, the connection 82 with the outlet is closed, and consequently the pressure at the ends of the slide valve is the same, psr1 is equal to that of psr and the spring 43 holds the sequence slide valve 4 in the closed condition.

By operating the control element, the pressure on the spring side 42 is progressively discharged, the pressure drop generated by the throttle 44 progressively decouples the pressures psr1 and psr. As soon as the pressure psr is greater than the sum of the force of the spring 43 and the pressure psr1, the slide valve moves from the normally closed position to an open position and allows the discharge of the series channel TA1 of the first control section as in the previous solutions upstream of the non-return valve VA1.

Through the duct 49 taken as a bypass from TA1, a passageway 45 opens towards the discharge line 5 connected to the outlet T.

What has been described in the previous solutions has, for the sake of descriptive simplicity, only been included on one of the work ports and in the first section, the findings of the invention are to be understood as achievable on both work ports and on several sections of the system in series, not necessarily and only the first control section of the control valve.

The invention claimed is:

1. An open-center valve device for operating machines comprising:

a first section and a second section, the sections being configured to be connected to respective pairs of work ports to operate a respective actuator of the operating machine, a high-pressure line configured in such a way as to be connected to a pump to supply a flow rate of an operating fluid to the sections, and a discharge line configured to be connected to an outlet for the operating fluid, each of the sections comprising a spool control element, configured in such a way as to send the flow rate to the respective work ports, the valve device further comprising:

one or more free flow segments configured in such a way as to define a free flow line connecting in successive sequence each of the spool control elements, each of the spool control elements including a free-circulation passage configured in such a way that, when all the spool control elements are in a neutral position, the high-pressure line is connected to the discharge line without sending the flow rate to the work ports, a series duct configured in such a way that, upon a movement from the neutral position of one of the spool control elements for operating one of the actuators, a return flow rate from a respective use is supplied to a subsequent spool control element, progressively closing the respective free flow passage, the spool control elements comprising respective return passages configured to receive the return flow rate, respective non-return valves being provided, inserted inside respective spool control elements, downstream of the return passages of the spool control elements and upstream of the series duct, wherein at least one of the spool control elements comprises at least one bypass passage, the spool control elements being configured in such a way that, when a spool control element is in the neutral position, the bypass passage is closed and, when the spool control element is moved from the neutral position to operate the respective actuator, the spool control element progressively puts the bypass passage into communication with the outlet via the discharge line or a low-pressure line directly connected to the outlet, wherein each of the first and second sections comprise a return line configured in such a way that, when one of the spool control elements is moved from the neutral position to operate the respective actuator, the return flow rate from a driven actuator is fed to the respective return passage, and wherein the valve device further comprises a bypass duct, the bypass duct being external to the spool control element and being arranged as a bypass to the return line in such a way as to bring the return flow rate to the bypass passage in parallel with the return passages.

2. A hydraulic system comprising a pump and a valve device according to claim 1.

3. An open-center valve device for operating machines comprising:

a first section and a second section, the sections being configured to be connected to respective pairs of work ports to operate a respective actuator of the operating machine, a high-pressure line configured in such a way as to be connected to a pump to supply a flow rate of an operating fluid to the sections, and a discharge line configured to be connected to an outlet for the operating fluid, each of the sections comprising a spool control element, configured in such a way as to send the flow rate to the respective work ports, the valve device further comprising:

one or more free flow segments configured in such a way as to define a free flow line connecting in successive sequence each of the spool control elements, each of the spool control elements including a free-circulation passage configured in such a way that, when all the spool control elements are in a neutral position, the high-pressure line is connected to the discharge line without sending the flow rate to the work ports, a series duct configured in such a way that, upon a movement from the neutral position of one of the spool control elements for operating one of the actuators, a return flow rate from a respective use is supplied to a subsequent spool control element, progressively closing the respective free flow passage, the spool control elements comprising respective return passages configured to receive the return flow rate, respective non-return valves being provided downstream of the return passages of the spool control elements and upstream of the series duct, wherein at least one of the spool control elements comprises at least one bypass passage, the spool control elements being configured in such a way that, when a spool control element is in the neutral position, the bypass passage is closed and, when the spool control element is moved from the neutral position to operate the respective actuator, the spool control element progressively puts the bypass passage into communication with the outlet via the discharge line or a low-pressure line directly connected to the outlet, wherein the sections comprise a return line configured in such a way that, when one of the spool control elements is moved from the neutral position to operate the respective actuator, the return flow rate from a driven actuator is fed to the respective return passage, and wherein the valve device further comprises a bypass duct, the bypass duct being arranged as a bypass to the return line in such a way as to bring the return flow rate to the bypass passage in parallel with the return passages and wherein the valve device further comprises a maximum pressure valve arranged along the bypass duct.

4. An open-center valve device for operating machines comprising:

a first section and a second section, the sections being configured to be connected to respective pairs of work ports to operate a respective actuator of the operating machine, a high-pressure line configured in such a way as to be connected to a pump to supply a flow rate of an operating fluid to the sections, and a discharge line configured to be connected to an outlet for the operating fluid, each of the sections comprising a spool control element, configured in such a way as to send the flow rate to the respective work ports, the valve device further comprising:

one or more free flow segments configured in such a way as to define a free flow line connecting in successive sequence each of the spool control elements, each of the spool control elements including a free-circulation passage configured in such a way that, when all the spool control elements are in a neutral position, the high-pressure line is connected to the discharge line without sending the flow rate to the work ports, a series duct configured in such a way that, upon a movement from the neutral position of one of the spool control elements for operating one of the actuators, a return flow rate from a respective use is supplied to a subsequent spool control element, progressively closing the respective free flow passage, the spool control elements comprising respective return passages configured to receive the return flow rate, respective non-return valves being provided downstream of the return passages of the spool control elements and upstream of the series duct, wherein at least one of the spool control elements comprises at least one bypass passage, the spool control element being configured in such a way that, when the spool control element is in the neutral position, the bypass passage is closed and, when the spool control element is moved from the neutral position to operate the respective actuator, the spool control element progressively puts the bypass passage into communication with the outlet via the discharge line or a low-pressure line directly connected to the outlet, and wherein the valve device further comprises a two-way sequence slide valve through which the return flow rate is discharged.

5. The valve device according to claim 4, wherein the sequence slide valve is formed outside the spool control element.

6. The valve device according to claim 4, wherein the slide valve is normally closed and defines respective opposite ends, a pressure signal taken from a reduced pressure line acting on a first end, the reduced pressure being lower than the pressure of the high-pressure line, and a spring and a decoupled reduced pressure, which is decoupled by a throttle with respect to the pressure existing on the first end of the slide valve, acting on a second end, opposite to the first end.

7. The valve device according to claim 6, wherein the second connected end is connected to the bypass passage through an additional duct.

8. The valve device according to claim 6, wherein the reduced pressure line is configured to pilot respective spools of the spool control elements.

9. The valve device according to claim 4, wherein the slide valve defines respective opposite ends, a pressure existing in a duct derived from the return passage upstream of the non-return valve acting on a first end and a spring and a pressure, which is decoupled by a throttle with respect to the pressure existing on the first end of the slide valve, acting on a second end, opposite to the first end.

* * * * *